United States Patent Office 3,804,941
Patented Apr. 16, 1974

3,804,941
PROCESS FOR THE EXTRACTION OF TUNGSTEN FROM AN AQUEOUS ALKALINE SOLUTION
Peter Coad, Midwest City, and John Arthur Hill, Edmond, Okla., assignors to Kerr-McGee Chemical Corp., Oklahoma City, Okla.
No Drawing. Filed Apr. 24, 1972, Ser. No. 246,909
Int. Cl. C01g 41/00
U.S. Cl. 423—54
10 Claims

ABSTRACT OF THE DISCLOSURE

The present invention comprises a solvent extraction process for the recovery of tungsten from an aqueous alkaline solution. The solution is sulfidized to convert the tungsten therein to a thiotungstate species and subsequently contacted with an organic phase comprising an extractant in an organic diluent, whereby the thiotungstate forms a complex with the extractant in the organic phase. The organic phase containing the thiotungstate complex is recovered and hydrolyzed to convert the thiotungstate complex to a tungstate complex whereby the tungsten is readily recoverable using known techniques.

BACKGROUND OF THE INVENTION

The ability of tungsten to harden metals with which it is alloyed makes it a valuable element in the manufacture of various metal products such as machine-tool steels. Further, drawn tungsten wire is indispensable in the manufacture of filaments for electric lamps. In the manufacture of tungsten metal, the principal raw materials used are concentrates of scheelite-type ores and concentrates of wolframite-type ores. The two types of ore differ substantially in chemical composition and are generally processed by different chemical decomposition methods. For example wolframite is usually decomposed by heating with an aqueous solution of sodium hydroxide which takes the tungsten in solution as sodium tungstate. On the other hand, the decomposition of scheelite is almost entirely effected by subjecting finely ground scheelite ore to the leaching effect of a hot concentrated hydrochloric acid to form an insoluble tungstic acid. However, some impurities remain with the tungstic acid, such as molybdenum and silica. Thus, the tungstic acid requires further purification steps.

Solvent extraction processes have been known heretofore for recovering tungsten from acidic solutions. An example of such a process is disclosed in U.S. 3,051,516. However, no completely successful solvent extraction process is known for the recovery of tungsten from alkaline solutions. A recent attempt was reported ("Recovery and Purification of Tungsten by the Liquid Ion Exchange Process," Unit Processes in Hydrometallurgy—Metallurgical Society Conferences, volume 24, Feb. 24–28, 1963, pp. 504–514) wherein about 40% of the tungsten present in an alkaline solution could be recovered at high pH values (pH=13 or higher) utilizing a quaternary amine.

It has been stated (L. G. Carpenter and D. E. Garrett, Mining Engineering, March 1959) that the largest single tungsten deposit in the United States is at Searles Lake, Calif. It is estimated to contain 170 million pounds of $WO_3$ which exceeds the total of all other known tungsten in the United States. The tungsten is present in a soluble form in the brines at Searles Lake in an amount of about .007% by weight expressed as $WO_3$. Treatment of the Searles Lake brine in processes to recover various salts contained therein produces solutions containing tungsten in an amount of about 0.24% by weight as $WO_3$. A process to recover that tungsten would be desirable. However, such tungsten containing solutions are alkaline (pH 9.0–11.0) and highly buffered. Therefore, the cost of a tungsten recovery process that requires either acidification or basification would be prohibitive.

SUMMARY OF THE INVENTION

The present invention relates to a process for recovering tungsten from aqueous alkaline solutions. More particularly, the present invention relates to a solvent extraction process for recovery of tungsten from alkaline brines such as those found at Searles Lake. Broadly, the present invention comprises sulfidizing a tungsten containing alkaline solution to convert the tungsten contained therein to a thiotungstate and subsequently contacting the solution with an organic phase comprising an extractant in an organic diluent whereby the thiotungstate forms a complex with the extractant in the organic phase. The thiotungstate-extractant complex in the organic phase then is hydrolyzed to convert it to a tungstate-extractant complex; the tungsten then is readily strippable from the organic phase by known methods.

DESCRIPTION OF A PREFERRED EMBODIMENT

The process of the instant invention is applicable to any alkaline solution having a pH of from 7 to 11 and containing as little as 0.007 percent tungsten.

It is important feature of the invention that substantially all of the tungsten, present in the form of a tungstate ion ($WO_4^=$), in the alkaline solution be of the thiotungstate species contemplated by the instant invention are $WS_4^=$, $WOS_3^=$, $WO_2S_2^=$ and $WO_3S^=$. The more readily extractable species are, of course, the $WS_4^=$ and $WOS_3^=$ species.

It will be appreciated that in a reaction system in which two or more species are reversibly formed by competing reaction processes the more stable one is not always the one that is more rapidly formed. This means that the thermodynamically more stable species is not necessarily the same species produced under steady state conditions. In the case of a thiotungstate, for example, at a pH of about 10 the more stable species is $WS_2O_2^=$. However, the more readily extractable species is the more rapidly formed $WS_4^=$. Thus, it is preferred to extract the thiotungstates before they reach equilibrium. The time required for the system to reach equilibrium is a function of several variables such as, for example, temperature, concentration and the like. In practice it has been found advantageous to extract the thiotungstate within one half hour of the sulfidizing.

The sulfidizing may be accomplished by contacting the alkaline solution with a sulfidizing agent such as hydrogen sulfide gas. Further, the tungsten may be sulfidized with an aqueous solution containing hydrogen sulfide, thiometalates, polysulfides or combinations thereof. Examples of suitable thiometalates include sodium thioarsonate and sodium thioarsonite. The applicable polysulfides include sodium, potassium and ammonium polysulfides.

The brine should be contacted with at least the stoichiometric amount of sulfidizing agent required to convert all of the tungsten contained therein to the thiotungstate species. When the alkaline solution is a brine, such as is found at Searles Lake, a considerable excess of the stoichiometric requirements for conversion of all the tungsten to the thiotungstate species is required. Preferably, there will be present from about 3 to 10 times the stoichiometric amount of sulfidizing agent required to convert all of the tungsten in the brine to the thiotungstate species.

When using an aqueous solution of a sulfidizing agent, the amount of the sulfidizing agent present in the aqueous solution will depend, of course, upon the ratio of sulfidizing solution to alkaline solution employed, contact time, temperature, amount of tungsten in the alkaline solution and the like. When using an aqueous solution of hydrogen sulfide to sulfidize a brine such as is found at Searles Lake, it is advantageous to utilize at least 10 grams per liter of hydrogen sulfide in the solution.

In accordance with the process of the instant invention an alkaline solution containing thiotungstate is contacted with an organic phase comprising an extractant in an organic diluent. The term extractant as used herein contemplates compounds represented by the general formulas:

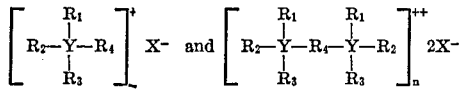

wherein $R_1$, $R_2$, $R_3$, and $R_4$, are aliphatic hydrocarbon radicals containing from 1 to 18 carbon atoms, X is an anion such as Cl, $SO_4$, $CO_3$ and the like, Y is selected from the group consisting of nitrogen and phosphorous and $n$ is an integer of from 1 to 3, equal to the valence of the anion. A preferred group of compounds are those wherein $R_4$ is a lower alkyl group having from 1 to 4 carbon atoms and $R_1$, $R_2$ and $R_3$ are selected from long chain aliphatic hydrocarbon groups having from 8 to 18 carbon atoms. A particularly preferred group of compounds are the quaternary ammonium chlorides. Examples of typical ammonium and phosphonium radicals which extract thiotungstates includes: trimethyl myristyl ammonium; trimethyl palmityl ammonium; trimethyl stearyl ammonium; trimethyl coco ammonium; trimethyl tallow ammonium; dimethyl dipalmityl ammonium; dimethyl di(oleyllinoleyl) ammonium; dimethyl dicoco ammonium; dimethyl amyllauryl ammonium; methyl tricaprylyl ammonium; N-coco-N,N - dimethyl - N',N',N' - trimethyl - 1,3 - propylene diammonium; N - tallow - N,N - dimethyl - N',N',N' - trimethyl - 1,3 - propylene diammonium; dodecyltributyl phosphonium, tributyl monomethyl phosphonium; trioctyl monomethyl phosphonium; and octalytributyl phosphonium.

In addition to the extractant, the organic phase includes an inert organic diluent. The applicable organic diluents include hydrocarbon solvents such as isooctane, kerosene, benzene, toulene, xylene, isodecane, fuel oils, mineral oils, hexane, heptane, octane, and the like. Chlorinated hydrocarbons, such as chloroform also are suitable. Further, the diluent may include functional groups providing that the functional groups do not adversely affect the extraction. The essential feature of the organic diluent is that it be substantially brine-immiscible. The preferred organic diluents have a solubility in water of less than about 0.5%.

The organic diluent may contain a modifier in an amount of up to about 10% by weight of the total organic phase. Typical of such modifiers are long chain aliphatic alcohols such as capryl alcohol, isodecanol, tridecanol, 2-ethl hexanol, and the like. The addition of such modifiers improves the solubility of the extractant in the organic diluent. Particularly good results have been obtained when the organic diluent contained from about 4 to 8% by weight of such modifiers.

The extractant may be employed in widely varying amounts. Generally, the amount present will be from about 1 to 15% by weight, based on the total organic phase, with an amount of from about 2 to 10% by weight being particularly preferred.

The amount of organic phase to be used for most efficient extraction is from about 0.15 to 10 times the volume of aqueous alkaline solution to be treated. The preferred ratio of organic phase to aqueous alkaline solution is of course dependent upon the concentration of extractant in the organic phase, the temperature at which the extraction is performed, the contact time between the two phases, and the amount of thiotungstate in the alkaline solution. Generally, the ratio of organic phase to aqueous alkaline solution will be in the range of from 0.25:1 to 2:1.

The contact time between the organic phase and the aqueous alkaline solution is an important variable to consider when extracting thiotungstate from an alkaline brine, such as is found at Searles Lake. In practice, contact times of from 1 minute to 60 are satisfactory, with about 3 minutes to 5 minutes per contact being especially preferred at temperatures of from about 20° C. to 60° C. Iodine and bromine are also extracted. Methods are known, separate from this invention, to remove these ions should their presence interfere with tungsten extraction.

After contacting a thiotungstate containing alkaline solution with the organic phase, whereby the thiotungstate is extracted into the organic phase, the loaded organic phase may be recovered by virtue of its immiscibility. It has been found that recovery of the tungsten from a loaded organic phase is greatly facilitated if the organic phase is hydrolyzed. The purpose of hydrolysis is to convert the thiotungstate in the organic phase to a readily strippable tungstate species ($WO_4^=$). The hydrolysis may be accomplished by using various oxidants such as a sodium hypochlorite solution, air, or sodium persulfate. Another method of hydrolysis is to contact the loaded organic with an aqueous sodium acetate/acetic acid solution at a pH within the range of from about 3 to 6. Particularly good results have been obtained when the system pH was maintained within a range of from 4 to 5.5.

Once the thiotungstate in the loaded organic has been converted to a tungstate species it is readily strippable with an aqueous salt solution. The ratio of aqueous salt solution to organic is not critical and is generally in the range of from about 1:10 to 10:1. An organic to aqueous ratio of about 5:1 is usually preferred at ambient temperatures.

The equilibrium pH of the stripping solution is important. At a pH of less than about 7 little stripping of the tungstate from the organic occurs. Therefore, it is necessary to add a base to the strip solution to ensure that the equilibrium pH of the solution will remain above 7. Generally it is preferred to maintain the pH above about 9 and particularly good results are obtained at a pH above about 12. The use of a base in stripping solutions is well known to those skilled in the art and includes such basic compounds as $NH_4OH$, NaOH and the like. A preferred strip solution is a 3 N $NH_4Cl$ or NaCl:4 N $NH_4OH$ or NaOH solution, as those skilled in the art will appreciate.

Example I

A quantity of an alkaline brine (Searles Lake) concentrate is obtained containing 2.7 g./l. of tungsten as $WO_3$. A 7.6 liter quantity of that brine, containing about 20 g. of tungsten as $WO_3$, is sulfidized with 150 g. of $H_2S$. The sulfidized brine is contacted with an organic phase comprising 10% Aliquat 336 (a commercially available tricaprylyl monomethyl ammonium chloride), 5% isodecanol and 85% kerosene. An organic to aqueous ratio of 1:3 is used in a bath type mixer-settler with a contact time of about 2 minutes. Approximately 70% of the tungsten present in the brine concentrate is extracted into the organic phase. A 2.5 liter portion of the tungsten loaded organic phase, containing approximately 5 g. of tungsten per liter or a total of about 13 g. of tungsten, is hydrolyzed with 2.5 liters of 4 N sodium acetate:acetic acid buffer soltuion (pH 4.6). The hydrolyzed organic phase is stripped with a 3 N $NH_4Cl$:4 N $NH_4OH$ solution in a 2.5:1 $O/A$ ratio. The ammonia is evaporated by boiling the strip solution. Approximately 14 g. of ammonium paratungstate is recovered by filtering the remaining solution and drying the filtrate.

Analysis of the product is shown in Table I below.

TABLE I

| | $5(NH_4)_2O \cdot 12\ WO_3 \cdot 5H_2O$ | |
|---|---|---|
| Constituent determined | Percent found | Percent calculated |
| W as $WO_3$ | 87.0 | 88.81 |
| N as $NH_4$ | 5.68 | 5.76 |
| Wt. loss at 700° C | 11.3 | 11.18 |

From the analysis it is seen that 87% of the 14 g. of product (about 12 g. total) is tungsten. Thus, the analysis clearly demonstrates that substantially all the tungsten present in the loaded organic phase is readily stripped from the organic phase following hydrolysis.

Example II

A synthetic aqueous alkaline brine concentrate is prepared having the following approximate composition.

| Compound: | Percent |
|---|---|
| NaCl | 7.7 |
| KCl | 9.7 |
| $Na_2CO_3$ | 5.6 |
| $Na_2SO_4$ | 1.8 |
| $Na_2B_4O_7 \cdot 10H_2O$ | 8.5 |
| $H_2O$ | 66.7 |

$Na_2WS_2O_2$ as W, 2.0 g./l.

Various candidate organic extractants are contacted with samples of the tungsten containing brine. The extractant is in an organic phase comprising 10% by volume extractant, 85% by volume solvent and 5% by volume isodecanol. The solvent is kerosene and an organic to aqueous ratio of 1:1 is used except where noted hereinbelow in Table III. The brine and organic phase are shaken in a separatory funnel for one minute. The aqueous and organic phase are allowed to separate and samples of the organic phase are taken.

The samples are analyzed by X-ray emission for tungsten content, the percent tungsten extracted calculated and the results are set forth in Table II below.

TABLE II

| | Extractant cation name | Percent W extracted |
|---|---|---|
| 1 | Trimethyl myristyl ammonium | 35 |
| 2 | Trimethyl palmityl ammonium | 32 |
| 3 | Trimethyl stearyl ammonium | 40 |
| 4 | Trimethyl coco ammonium | 15 |
| 5 | Trimethyl tallow ammonium | 45 |
| 6[1] | Dimethyl dipalmityl ammonium | 50 |
| 7[1] | Dimethyl di(oleyl-linoleyl) ammonium | 50 |
| 8[1] | Dimethyl dicoco ammonium | 55 |
| 9 | Dimethyl amyl-lauryl ammonium | 75 |
| 10 | N-coco-N,N-dimethyl-N',N',N-trimethyl-1,3-propylene diammonium | 35 |
| 11 | N-tallow-N, N-dimethyl-N',N',N'-trimethyl-1,3-propylene diammonium | 10 |
| 12 | Tributyl dodecyl phosphonium | 30 |
| 13[2] | Tributyl monomethyl phosphonium | 25 |
| 14 | Trioctyl monomethyl phosphonium | 30 |
| 15 | Octyl tributyl phosphonium | 30 |
| 16 | Methyl tricaprylyl ammonium | 75 |

[1] Chloroform solvent and organic to aqueous ratio of 2:1.
[2] Chloroform solvent and organic to aqueous ratio of 1:1.

The foregoing results demonstrate that all of the candidate extractants extract tungsten from an alkaline brine when used in accordance with the process of the present invention.

While the present invention has been described with respect to certain preferred embodiments, it is contemplated that certain changes, substitutions and modifications may be made without departing from its true scope.

What is claimed is:

1. A solvent extraction process for recovery of tungsten from an aqueous alkaline brine containing the same and having a pH of from about 7 to 11 comprising sulfidizing the solution to convert substantially all of the tungsten contained therein to a thiotungstate species, contacting the sulfidized alkaline solution with an organic phase comprising an extractant in an organic diluent whereby the thiotungstate forms a complex with the extractant in the organic phase and recovering the thiotungstate containing organic phase; said extractant being selected from the group consisting of compounds represented by the formulas

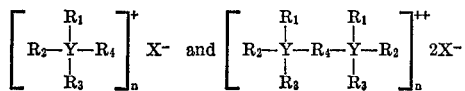

wherein $R_1$, $R_2$, $R_3$ and $R_4$ are aliphatic hydrocarbon radicals containing from 1 to 18 carbon atoms, X is an anion selected from the group consisting of Cl, $SO_4$ and $CO_3$; Y is selected from the group consisting of nitrogen and phosphorous and $n$ is an integer of from 1 to 3, equal to the valence of the anion.

2. The process of claim 1 wherein the aqueous alkaline brine is sulfidized with an aqueous solution containing at least 10 grams per liter of hydrogen sulfide.

3. The process of claim 1 wherein the extractant is a quaternary ammonium chloride.

4. The process of claim 1 wherein the thiotungstate containing organic phase is hydrolyzed to convert the thiotungstate-extractant complex to a tungstate-extractant complex.

5. The process of claim 4 wherein the organic phase is acetic acid.

6. The process of claim 5 wherein the aqueous buffer has a pH within the range of from about 3 to 6.

7. The process of claim 6 wherein the hydrolyzed loaded organic phase is stripped with an aqueous salt solution having a pH above about 9.

8. The process of claim 7 wherein the aqueous salt solution comprises a mixture of $NH_4OH$ and $NH_4Cl$.

9. The process of claim 1 wherein the aqueous alkaline brine contains tungsten in a concentration of at least 0.007% by weight.

10. The process of claim 1 wherein the predominant tungsten species in the sulfidized alkaline brine is at least one thiotungstate selected from the group consisting of $WS_4^=$ and $WOS_3^=$.

References Cited

UNITED STATES PATENTS

| 3,083,085 | 3/1963 | Lewis et al. | 423—54 |
| 3,079,226 | 2/1963 | Newkirk | 75—101 BE |
| 3,293,004 | 12/1966 | Musgrove et al. | 23—312 ME |

OTHER REFERENCES

Coleman et al., "Proceeding of International Conference on Peaceful Uses of Atomic Energy," vol. 28, 1958, pp. 278–288.

HERBERT T. CARTER, Primary Examiner

U.S. Cl. X.R.

75—101 BE

UNITED STATES PATENT OFFICE
CERTIFICATE OF CORRECTION

Patent No. 3,804,941      Dated April 16, 1974

Inventor(s) Peter Coad and John Arthur Hill

It is certified that error appears in the above-identified patent and that said Letters Patent are hereby corrected as shown below:

Column 3, lines 8 - 11, first formula should read --

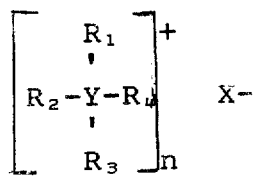

Column 4, line 42 should read -- strip solution is a 3 $\underline{N}$ $NH_4Cl$ or NaCl:4 $\underline{N}$ $NH_4OH$ or --

Column 4, line 54, "bath" should be -- batch --

Column 4, line 60 should read -- is hydrolyzed with 2.5 liters of 4 $\underline{N}$ sodium acetate: acetic --

Column 4, line 62 should read -- phase is stripped with a 3 $\underline{N}$ $NH_4Cl$:4 $\underline{N}$ $NH_4OH$ solution --

Column 6, line 34, Claim 5 should read --

5. The process of Claim 4 wherein the organic phase is hydrolyzed with an aqueous buffer of sodium acetate-acetic acid.

Signed and sealed this 19th day of November 1974.

(SEAL)
Attest:

McCOY M. GIBSON JR.
Attesting Officer

C. MARSHALL DANN
Commissioner of Patents